United States Patent Office 3,749,723
Patented July 31, 1973

3,749,723
CERTAIN BARBITURIC ACID DERIVATIVES
Andre Allais, Les Lilas, and Michel Peterfalvi, Paris, France, assignors to Roussel-UCLAF, Paris, France
No Drawing. Filed Dec. 14, 1971, Ser. No. 207,953
Claims priority, application France, Dec. 22, 1970, 46,213
Int. Cl. C07d 51/20
U.S. Cl. 260—256.4 C     3 Claims

ABSTRACT OF THE DISCLOSURE

Novel malonylureas of the formula

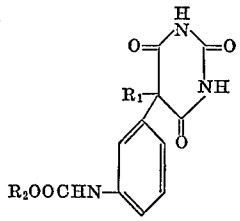

in which $R_1$ and $R_2$ are identical or different and represent an alkyl radical carrying from 1 to 6 carbon atoms, and their organic or mineral base salts, and their use as anti-convulsant agents.

---

The object of this invention is new derivatives of malonylurea as well as a process of preparation of these compounds.

More precisely, the object of this invention is the derivatives of Formula I:

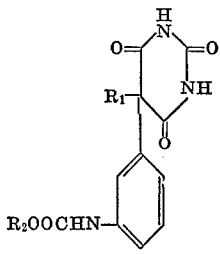

in which $R_1$ and $R_2$ are identical or different, and represent an alkyl radical carrying from 1 to 6 carbon atoms, and their organic or mineral base salts.

The products of the invention have remarkable pharmacological properties. Notably, they produce a marked anticonvulsant action without a resulting depression of the central nervous system, or a hypnotic effect.

This effect is all the more surprising since barbiturates, for example phenobarbital, produce, in addition to their anticonvulsant action, a depressive and hypnotic effect which necessitates the simultaneous administration of an amphetamine.

Among the compounds of Formula I can be listed more specifically: 5-(metacarbethoxy aminophenyl) 5-ethyl malonylurea and 5-(metacarbethoxy aminophenyl) 5-n-butyl malonylurea.

Among the salts one can cite notably those of sodium, potassium, ammonium, and diethylamine.

The process for preparing these new derivatives of malonylurea is essentially characterized by causing to react, in the presence of a basic agent, an alkyl chloroformate of the formula: $ClCOOR_2$ in which $R_2$ represents an alkyl radical carrying from 1 to 6 carbon atoms, with a 5 - (meta aminopheny) 5 - alkylmalonylurea of the formula:

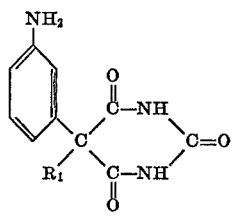

in which $R_1$ represents an alkyl radical carrying from 1 to 6 carbon atoms, then, if desired, forming the salt of the resulting compound with an organic or mineral base.

The condensation of the chloroformate and 5-(meta aminophenyl) 5-alkyl malonylurea is conducted preferably in an organic solvent such as acetone. The basic agent used is selected preferably from the group consisting of pyridine, triethylamine, a collidine, a lutidine and hexamethylphosphortriamide.

The products of the invention can be presented for therapeutic use in a proper form for oral, parenteral, or rectal administration, chiefly in the form of injectable solutions or suspensions, of plain or coated tablets, of syrups or suppositories. These pharmaceutical forms are prepared by the usual techniques of the pharmaceutical industry.

The dosage used with these compounds can range between 0.50 g. and 2 g. a day for an adult, depending on the method of administration.

5-(meta aminophenyl) 5-ethyl malonylurea can be obtained according to the process described in the article by M. M. Rising and Coll., J. Am. Chem. Soc. 55, 2817 (1933). The other 5-(meta aminophenyl) 5-alkyl malonylureas can be obtained by an analogous process starting from a 5-phenyl 5-alkyl malonylurea by nitration, then reduction.

The following examples illustrate the invention without attributing to it any limitative characteristic.

EXAMPLE 1

5-(metacarbethoxy aminophenyl) 5-ethyl malonylurea 100 g. of 5-(meta aminophenyl) 5-ethyl malonylurea are dissolved in 1,000 cc. of pyridine and cooled to $-20°$ C. with agitation in an inert atmosphere, and then 42 cc. of ethyl chloroformate are added. The reaction mixture is left for 30 minutes at $-15°$ C., brought to room temperature over a period of 15 minutes, then kept one hour with stirring in an inert atmosphere at ordinary temperature. The mixture is then poured into a solution prepared from:

Cc.
Water ------------------------------------- 5,000
Hydrochloric acid (22° Bé.) --------------- 1,000 then extracted with a mixture of methylene chloride-ethanol (4–1). The organic phases are separated, washed with water till neutral, dried over magnesium sulfate, and evaporated to dryness under vacuum. The residue is extracted by refluxing with 1830 cc. of 50% ethanol. It is filtered and the filtrate kept overnight in the refrigerator after crystallization has started. The precipitate is separated, filtered, washed with cold 50% ethanol, and dried. Thus, 89.8 g. of 5-(metacarbethoxy aminophenyl) 5-ethyl malonylurea with a melting point of 192° C. is collected. This product appears as colorless crystals, soluble in dilute alkalies, slightly soluble in chloroform and insoluble in water and ether.

*Analysis.*—Calcd. for $C_{15}H_{17}N_3O_5$ (=319.31) (percent:) C, 56.42; H, 5.37; N, 13.16. Found (percent): C, 56.2; H, 5.2; N, 13.2.

Spectrum UV (1) ethanol:

$\lambda$max. 238 nm. $E_{1cm.}^{1\%}=537$ 280 nm. $E_{1cm.}^{1\%}=41$ inflect. near 286 nm. $E_{1cm.}^{1\%}$ 36

(2) Ethanol+NaOH 0.1 N:

$\lambda$max. 237–238 nm. $E_{1cm.}^{1\%}=649$ inflect. near 260 nm. $E_{1cm.}^{1\%}=211$ inflect. near 286 nm. $E_{1cm.}^{1\%}=47$ As far as is known, this compound has not been described in the literature.

EXAMPLE II 5-(metacarbethoxy aminophenyl) 5-ethyl malonylurea 5 g. of 5-(meta aminophenyl) 5-ethyl malonylurea are dissolved in 10 cc. of pyridine and 20 cc. of acetone. The solution is cooled to —20° C. in an inert atmosphere and a solution of 2.1 cc. of ethyl chloroformate in 2.5 cc. of acetone are added over 5 minutes with stirring. The reaction mixture is maintained for 30 minutes below —15° C., then brought to room temperature over a period of fifteen minutes. It is stirred for 1½ hours then poured into a solution of

|  | Cc. |
|---|---|
| Hydrochloric acid (22° Bé.) | 10 |
| Ice water | 162.5 |

After stirring for one hour at 0°, the precipitate is separated and washed with water till neutral and free of chlorides. The product is then dried at 90° C. There is thus obtained 6.1 g. of 5-(metacarbethoxy aminophenyl) 5-ethyl malonylurea with melting point of 190° C. The product is purified by recrystallisttion in 90 cc. of 50% ethanol. It is filtered while warm, then left standing in refrigeration for one hour after crystallization has begun. The crystalline precipitate is washed with cold 50% ethanol and dried under vacuum. Thus, 5.8 g. of pure product with a melting point of 192° C., identical to that of Example I, is collected.

EXAMPLE III 5-(meta carbethoxy aminophenyl) 5-n-butyl malonylurea

By the same method as that of Example I, starting from 5-(meta aminophenyl) 5-n-butyl malonylurea, one obtains 5-(meta carbethoxy aminophenyl) 5-n-butyl malonylurea.

As far as is known, this compound is not described in the literature.

5-(meta aminophenyl) 5-n-butyl malonylurea can be obtained in the following manner:

(A) 5-meta nitrophenyl) 5-n-butyl malonylurea.—One adds to 20 cc. of sulfuric acid (66° Bé.), 5 g. of 5-phenyl 5-n-butyl malonylurea. The mixture is cooled to —10° C. and a mixture of 1.1 cc. of nitric acid (48° Bé.) and of 5 cc. of sulfuric acid (66° Bé.) cooled to 0° C. is added; the reactional mixture is kept for one hour at 0° C., then poured onto ice; the precipitate formed is filtered, washed with water, dried, and crystallized with n-butanol to give 2 g. of 5-(meta nitrophenyl) 5-n-butyl malonylurea, M.P. 290°.

A second crystallization of this compound with n-butanol leaves the melting point unchanged.

*Analysis.*—Calcd. for $C_{14}H_{15}N_3O_5$ (=305.28) (percent): C, 55.08; H, 4.95; N, 13.76. Found (percent): C, 55.1; H, 4.9; N, 14.0.

As far as is known, this compound is not described in the literature.

(B) 5-(meta-aminophenyl) 5-n-butyl malonylurea.— Into an hydrogenation apparatus is added 40 cc. of a 0.1 N aqueous sodium hydroxide solution and 1.2 g. of 5-(meta nitrophenyl) 5-n-butyl malonylurea, then 0.120 g. of active carbon palladized with 18% palladium in the form of the hydroxide is added and the apparatus is purged with hydrogen. Upon agitation 269 cc. of hydrogen are absorbed in 10 minutes. The catalyst is removed by filtration and the filtrate is acidified with 4 cc. of 2 N hydrochloric acid and filtered again. The solution obtained is made alkaline with 2 cc. of 2 N sodium hydroxide; the precipitate formed is filtered, washed with water, dried and 0.8 g. of 5-(meta aminophenyl) 5-n-butyl malonylurea, M.P. 171° C. are obtained.

The recrystallization of this compound in ethanol leaves the melting point unchanged.

As far as is known this compound is not described in the literature.

The 5-phenyl 5-n-butyl malonylurea is cited by G. A. Alles and Coll. J. Pharmacol. 89, 356 (1947).

PHARMACOLOGICAL STUDY OF THE 5-METACARBETHOXY AMINOPHENYL) 5-ETHYL MALONYLUREA

Determination of the anticonvulsant effect (1) Convulsions produced by pentamethylenetetrazole.—Groups of 10 female mice were used; the product under study, used in sodium hydroxide solution, was administered intraperitoneally in doses of 20, 50, and 100 mg./kg.; the control group received only the solvent.

A half an our after the injection, a solution of pentamethylenetetrazole in the physiological serum was injected into the mice in a concentration of 3 mg./cc.; the intravenous perfusion was performed at the rate of 1 cc. a minute.

During the perfusion, the progress of intoxication was characterized by the following three criteria:

(a) beginnings of convulsant effect (myoclonia of the ears)
(b) seizure of clonic convulsions
(c) tonic convulsion with apnea and generally followed by death.

The doses of pentamethylenetetrazole corresponding to these effects were noted.

The following table summarizes the results obtained.

DOSES OF PENTAMETHYLENETETRAZOLE

| Groups | Doses, mg./kg. | Myoclonia | Clonic attack | Tonic attack |
|---|---|---|---|---|
| Control | 0 | 37.1 | 42.0 | 70.2 |
| Studied product | 20 | 36.5 | 40.7 | 77.7 |
|  | 50 | 35.2 | 39.3 | 100.8 |
|  | 100 | 38.9 | 43.3 | 115.8 |

According to this test, it can be ascertained that the product studied possesses a distinct anticonvulsant activity from a dose of 50 mg./kg.

(2) Research of the beginning of cortical excitability.— The female rats weighing 100–110 g. were stimulated by means of corneal electrodes with an electric current of 25 milliamps; the voltage was determined for each animal and corresponds to the beginnings of cortical excitability; this beginning is manisfested by several myoclonic movements; movement of the ears and of the vibrissae. The animals were standardized 24 hours before the test. The product under study was administered intraperitoneally or orally in different doses and the animals were tested at the moment of the product's maximum effect.

According to the conditions of the experiment, the 5-(metacarbethoxy aminophenyl) 5-ethyl malonylurea raises the beginning of excitability with a dose of 100 mg./kg. intraperitoneally and of 200 mg./kg. orally.

(3) Test of maximal attacks.—Female rats weighing 100–110 g. were stimulated by means of corneal electrodes with an electric current of 50 milliamps and 140 volts; the number of rats registering a maximal seizure was determined. This seizure was characterized by a tonic phase of flexing of the anterior feet, followed several seconds later by an extension of the posterior feet; this tonic phase lasted several seconds, then some clonic movements appeared. The animals were standardized 24 hours before the test. The product under study was administered intraperitoneally or orally and the animals were tested at the moment when the product seemed to have its maximal effect. The active dose 50% $AD_{50}$ is the dose which reduces by ½ the number of maximal attacks.

According to the conditions of the experiments, the $AD_{50}$ of 5-(metacarbethoxy aminophenyl) 5-ethyl malonylurea is from 20–50 mg./kg. given intraperitoneally and the dose of 50 mg./kg. gives about 50% protection administered orally.

(4) Hypnotic effects.—The "liminal narcotic" dose of phenobarbital is equal to 20 mg./kg. taken intraperitoneally, a dose with which motor incoordination appears. The distinctly narcotic dose, with total loss of the reflux of sitting up again is at 100 mg./kg.

5-(metacarbethoxy aminophenyl) 5-ethyl malonylurea, by contrast, is totally lacking in hypnotic effect, no matter what dosage is used. No loss of the reflux of sitting up again is noted, up to a fatal dosage.

Determination of acute toxicity

Acute toxication has been determined in the groups of mice of Swiss strain, weighing from 18–22 g. 5-(metacarbethoxy aminophenyl) 5-ethyl malonylurea was administered in rising doses either orally or intraperitoneally. The animals were kept under observation for one week. According to the conditions of the experiment, the lethal dose of 50% ($LD_{50}$) is from 750 mg./kg. intraperitoneally and higher than 2 g./kg. orally.

Several clincal cases explained hereafter, show the beneficial action of 5-(metacarbethoxy aminophenyl) 5-ethylmalonylurea on epileptic seizures.

Clinical results

5 - metacarbethoxy aminophenyl) 5-ethyl malonylurea, hereafter called "Aminobarbital" was administered, in the form of tablets of 0.25 g., to several patients ill with chronic affections of the nervous system and, more particularly, to those ill with epilepsy.

Case No. 1: BAS . . . Pierre, age 26.—Under care since 1962 for generalized epilepsy with infrequent seizures and the characteristic symptoms. After daily administration of 2 tablets of diphenylhydantoin and 5 tablets of aminobarbital; the subject had no new seizures; he is much more active, no longer has diurnal drowsiness, and does not fall asleep as easily at night.

Case No. 2: PEN . . .Yvon, age 26.—Generalized seizures and temporal seizures; unconscious psychomotor activity of more or less duration. The electroencephalogram shows a left temporal epileptic activity. Treatment: 2 sedative tablets, 2 patented pharmaceutical tablets, basically mephenytoin, sold commercially under the name of "Sédantoïnal" and 5 tablets of aminobarbital.

The patient responded quickly, no longer has major seizures, and has rarely minor mental lapses. He can continue working (which was impossible before) and is more alert.

Case No. 3: LAG . . . Monique, age 30.—This patient was hospitalized for epilepsy with generalized seizures and numerous time lapses. The subject was administered 3 tablets of phenobarbital 5 times a day, 2 tablets of a patented medicine, basically of primaclone and an intravenous injection of a sedative. This grand mal stopped after the first day of treatment; the attacks disappeared, but a distinct obnubilation persisted. Three tablets of aminobarbital were added to the treatment. A marked improvement and return to normal consciousness were noted. The patient left the hospital. A month after her departure, following new consultation, the treatment was modified by administering two patented pharmaceutical tablets basically of primaclone, 2 sedative tablets and 3 tablets of aminobarbital.

Hereafter, the patient has been well and no longer has attacks.

Case No. 4: ALL . . . Eric, age 16.—This is a case of a patient being treated for the first generalized seizure in June, 1969, a second generalized attack in January 1970 which caused a dislocation of the shoulder.

The electroencephalogram showed a bilateral paroxystic activity. The general examination was normal. The patient was first treated in June 1970 with tablets of a patent medicine using chiefly phenobarbital and of another patent based on a mixture of phenobarbital and sulfate of 1-phenyl 2-amino propane. The patient, at this time showed signs of personality problems.

The treatment was stopped in August 1970 because the phenobarbital led to losses of memory in the patient. This led to a seizure two weeks later.

At the end of the month, the treatment was replaced by daily administration of three tablets of aminobarbital.

Two weeks later there was no new seizure. A month later, the patient was satisfied with the treatment. He had improved greatly and was clearly less sluggish.

Case No. 5: PRE . . . Monique, age 35.—This was a case of an epileptic patient cared for medically since the age of 29. She suffered from generalized seizures as well as right hemiclonic attacks since the age of 14. She improved for two years after she left corticectomy rolandic.

Then the attacks began again. The patient alternated between periods of calm and periods with from 10–20 seizures a day.

The patient, who is of average intellect, underwent countless treatments.

In June 1970, the treatment in progress using phenobarbital tablets and patented pharmaceutical tablets containing phenobarbital and sulfate of 1-phenyl 2-amino propane which forced the patient to remain in bed and which caused a feeling of lightheadedness and depression was replaced by a treatment using 4 tablets of aminobarbital daily.

The patient was seen the first month, then the third month after commencement of this therapy. She no longer seems to have comitial seizures. She is much more alert, much less sleepy, sluggish and depressed.

Case No. 6: GUE . . . Daniel, age 23.—From the age of 8, generalized attacks and lapses, repeated grand mal despite a treatment of 4-phenobarbital tablets at a dose of 0.05 g., 2 tablets of diphenylhydantoin at a dose of 0.10 g., 3 tablets of sodium di-n-propylacetate at 200 mg. (sold under the trade name "Dépakine") and 3 ampoules of Diazepam 10 mg. (sold under the trade name Valium 10). In the past few years, 3 to 6 seizures daily; intellectual deterioration; delayed puberty; at age 17; terrible obesity; 100 kg. With the electroencephalogram, generalized epilepsy; P.L. normal; cranial X-rays, normal; thyroidal and suprarenalcortico balance, normal.

On induction into service, several generalized attacks despite the administration of 3 ampoules of diazépam 10 mg., of phenobarbital tablets at the dose of 20 cg., of 6 tablets of sodium di-n-propylacetate and of 2 tablets of primaclone (commercially known as "Mysoline"). The patient seems to have a significant intellectual deterioration correlated with ataxy by static cerebellar syndrome, a Parinaud syndrome. There was no pyramidal sign. The administration of a tranquilizer up to 6 mg. had no effect on the attacks.

At the end of 5 months, the patient was on the verge of a coma; he was oppressed, breathing difficultly, and was cyanotic. Any decrease in treatment risked setting off a grand mal. Persisting with it risked involving accidents by respiratory complications. Then the 5-(metacarbethoxy aminophenyl) 5-ethyl malonylurea were added to the treatment, increasing the amount up to 10 tablets; the phenobarbital was suppressed and the tranquilizer diminished progressively. The frequency of seizures is appreciably the same, but the patient "revived"; *he gets up* although he had been strapped to the bed; he writes, speaks, watches television and *walks alone*.

The treatment now consists of 3 tablets of diazépam 5 mg., 10 tablets of 5-(metacarbethoxy aminophenyl) 5-ethyl malonylurea at the dose of 0.25 g., 6 tablets of sodium di-n-propylacetate, 2 tablets of primaclone and 1½ tablets of tranquilizer.

What is claimed is:

1. A compound selected from the group consisting of those of the formula

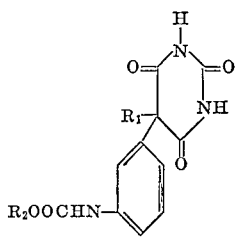

wherein $R_1$ and $R_2$ are each alkyl of from 1 to 6 carbon atoms, and their pharmaceutically acceptable salts with organic or mineral bases.

2. The compound of claim 1 which is 5-(metacarbethoxy aminophenyl) 5-ethyl malonylurea.

3. The compound of claim 1 which is 5-(metacarbethoxy aminophenyl) 5-n-butyl malonylurea.

References Cited

Wagner et al., Synthetic Organic Chemistry, Wiley, N.Y., 1953, pp. 646–7.

RICHARD J. GALLAGHER, Primary Examiner